US011352966B2

(12) United States Patent
Carlson et al.

(10) Patent No.: US 11,352,966 B2
(45) Date of Patent: Jun. 7, 2022

(54) DECELERATION CYLINDER CUT-OFF

(71) Applicant: Tula Technology, Inc., San Jose, CA (US)

(72) Inventors: Steven E. Carlson, Oakland, CA (US); Xin Yuan, Palo Alto, CA (US); Siamak Hashemi, Farmington Hills, MI (US); Vijay Srinivasan, Farmington Hills, MI (US); Srihari Kalluri, Ann Arbor, MI (US); Andrew W. Phillips, Rochester, MI (US); Mark A. Wilcutts, Berkeley, CA (US); Louis J. Serrano, Los Gatos, CA (US); Shikui Kevin Chen, San Jose, CA (US)

(73) Assignee: Tula Technology, Inc., San Jose, CA (US)

( * ) Notice: Subject to any disclaimer, the term of this patent is extended or adjusted under 35 U.S.C. 154(b) by 21 days.

(21) Appl. No.: 17/082,981

(22) Filed: Oct. 28, 2020

(65) Prior Publication Data

US 2021/0040904 A1 Feb. 11, 2021

Related U.S. Application Data

(60) Division of application No. 16/460,491, filed on Jul. 2, 2019, now Pat. No. 10,900,425, which is a division
(Continued)

(51) Int. Cl.
*F02D 41/00* (2006.01)
*F01N 11/00* (2006.01)
(Continued)

(52) U.S. Cl.
CPC .......... *F02D 41/0005* (2013.01); *F01N 9/00* (2013.01); *F01N 11/007* (2013.01); *F02D 13/06* (2013.01);
(Continued)

(58) Field of Classification Search
CPC .. F02D 41/0005; F02D 41/0087; F02D 41/12; F02D 13/06; F02D 2041/0012;
(Continued)

(56) References Cited

U.S. PATENT DOCUMENTS

| 3,756,205 A | 9/1973 | Frost |
| 4,062,334 A | 12/1977 | Toda et al. |

(Continued)

FOREIGN PATENT DOCUMENTS

| CN | 87107024 | 8/1988 |
| CN | 1924345 | 3/2007 |

(Continued)

OTHER PUBLICATIONS

European Office Action dated Sep. 9, 2021 from European Application No. 20158877.9-1007.
(Continued)

*Primary Examiner* — Phutthiwat Wongwian
*Assistant Examiner* — Sherman D Manley
(74) *Attorney, Agent, or Firm* — Beyer Law Group LLP (57) ABSTRACT

Controllers and methods for managing transitions into and/or out of a cylinder cut off mode are described. In some embodiments, a skip fire based transition into a cylinder cut off mode is used in which the fraction of working cycles that are fired is gradually reduced to a threshold firing fraction. Once the threshold firing fraction has been reached, all of the working chambers are deactivated.

24 Claims, 6 Drawing Sheets

Related U.S. Application Data of application No. 15/847,481, filed on Dec. 19, 2017, now Pat. No. 10,408,140, which is a continuation-in-part of application No. 15/584,686, filed on May 2, 2017, now Pat. No. 10,167,799, which is a continuation-in-part of application No. 15/009,533, filed on Jan. 28, 2016, now Pat. No. 9,790,867, which is a continuation-in-part of application No. 13/961,701, filed on Aug. 7, 2013, now Pat. No. 9,273,643, and a continuation-in-part of application No. 13/953,615, filed on Jul. 29, 2013, now Pat. No. 9,328,672.

(60) Provisional application No. 62/137,053, filed on Mar. 23, 2015, provisional application No. 61/683,553, filed on Aug. 15, 2012, provisional application No. 61/682,168, filed on Aug. 10, 2012, provisional application No. 61/677,888, filed on Jul. 31, 2012.

(51) Int. Cl.
*F02D 13/06* (2006.01)
*F01N 9/00* (2006.01)
*F02D 41/12* (2006.01)

(52) U.S. Cl.
CPC ......... *F02D 41/0087* (2013.01); *F02D 41/12* (2013.01); *F01N 2430/02* (2013.01); *F01N 2430/08* (2013.01); *F01N 2900/0412* (2013.01); *F01N 2900/08* (2013.01); *F02D 2041/0012* (2013.01); *F02D 2200/0406* (2013.01); *F02D 2200/602* (2013.01); *Y02T 10/40* (2013.01)

(58) Field of Classification Search
CPC ....... F02D 2200/0406; F02D 2200/602; F01N 9/00; F01N 11/007; F01N 2430/02; F01N 2430/08; F01N 2900/0412; F01N 2900/08; Y02T 10/40
See application file for complete search history.

(56) References Cited

U.S. PATENT DOCUMENTS

| | | | |
|---|---|---|---|
| 4,146,006 A * | 3/1979 | Garabedian | F02D 41/0087 123/481 |
| 4,204,483 A | 5/1980 | Harada et al. | |
| 4,274,382 A | 6/1981 | Sugasawa et al. | |
| 4,276,863 A | 7/1981 | Sugasawa et al. | |
| 4,305,365 A | 12/1981 | Iizuka et al. | |
| 4,434,767 A | 3/1984 | Kohama et al. | |
| 4,489,695 A | 12/1984 | Kohama et al. | |
| 4,494,503 A | 1/1985 | Danno et al. | |
| 4,509,488 A | 4/1985 | Forster et al. | |
| 4,592,315 A | 6/1986 | Kobayashi et al. | |
| 4,903,489 A | 2/1990 | Ruetz | |
| 4,945,869 A | 8/1990 | Klomp | |
| 5,117,790 A | 6/1992 | Clarke et al. | |
| 5,377,631 A * | 1/1995 | Schechter | F02D 13/06 123/198 F |
| 5,483,941 A | 1/1996 | Cullen et al. | |
| 5,597,371 A | 1/1997 | Toukura | |
| 5,667,029 A | 9/1997 | Urban et al. | |
| 5,669,357 A | 9/1997 | Denz et al. | |
| 5,720,257 A | 2/1998 | Motose et al. | |
| 5,769,054 A | 6/1998 | Schnaibel et al. | |
| 5,975,052 A | 11/1999 | Moyer | |
| 6,158,411 A | 12/2000 | Morikawa | |
| 6,532,944 B1 | 3/2003 | Leone et al. | |
| 6,553,962 B1 | 4/2003 | Russ et al. | |
| 6,615,776 B1 | 9/2003 | Von Andrian-Werburg | |
| 6,619,258 B2 | 9/2003 | McKay et al. | |
| 6,619,267 B1 | 9/2003 | Pao | |
| 6,625,535 B2 | 9/2003 | Han et al. | |
| 6,718,937 B2 | 4/2004 | Kim | |
| 6,735,938 B2 | 5/2004 | Surnilla | |
| 6,866,020 B2 | 3/2005 | Allston et al. | |
| 6,978,204 B2 | 12/2005 | Surnilla et al. | |
| 7,000,602 B2 | 2/2006 | Cullen et al. | |
| 7,032,572 B2 | 4/2006 | Bidner et al. | |
| 7,032,581 B2 | 4/2006 | Gibson et al. | |
| 7,063,062 B2 | 6/2006 | Lewis et al. | |
| 7,066,136 B2 | 6/2006 | Ogiso | |
| 7,080,625 B2 | 7/2006 | Albertson et al. | |
| 7,086,386 B2 | 8/2006 | Doering | |
| 7,128,044 B1 | 10/2006 | Doering et al. | |
| 7,146,966 B2 | 12/2006 | Nakamura | |
| 7,249,583 B2 * | 7/2007 | Bidner | F01L 13/00 123/198 DB |
| 7,308,886 B2 | 12/2007 | Bailes et al. | |
| 7,308,959 B2 | 12/2007 | Roberts | |
| 7,308,962 B2 | 12/2007 | Sen et al. | |
| 7,464,674 B2 | 12/2008 | Michelini et al. | |
| 7,503,312 B2 | 3/2009 | Surnilla et al. | |
| 7,526,375 B2 | 4/2009 | Buslepp et al. | |
| 7,566,103 B2 | 7/2009 | Wanner et al. | |
| 7,577,511 B1 | 8/2009 | Tripathi et al. | |
| 7,762,241 B2 | 7/2010 | Childress et al. | |
| 7,849,835 B2 | 12/2010 | Tripathi et al. | |
| 7,867,134 B2 | 1/2011 | Choi | |
| 7,886,715 B2 | 2/2011 | Tripathi et al. | |
| 7,900,596 B2 | 3/2011 | Hartmann et al. | |
| 7,930,087 B2 | 4/2011 | Gibson et al. | |
| 7,941,994 B2 | 5/2011 | Surnilla et al. | |
| 7,954,474 B2 | 6/2011 | Tripathi et al. | |
| 8,047,961 B2 | 11/2011 | Jess et al. | |
| 8,086,390 B2 | 12/2011 | Whitney et al. | |
| 8,099,224 B2 | 1/2012 | Tripathi et al. | |
| 8,131,445 B2 | 3/2012 | Tripathi et al. | |
| 8,131,447 B2 | 3/2012 | Tripathi et al. | |
| 8,157,035 B2 | 4/2012 | Whitney et al. | |
| 8,214,127 B2 | 7/2012 | Whitney et al. | |
| 8,225,771 B2 * | 7/2012 | Aso | F02D 41/042 123/481 |
| 8,355,860 B2 | 1/2013 | Liu et al. | |
| 8,386,150 B2 | 2/2013 | Whitney et al. | |
| 8,402,942 B2 | 3/2013 | Tripathi et al. | |
| 8,468,988 B2 | 6/2013 | Nishikiori et al. | |
| 8,550,055 B2 | 10/2013 | Ferch et al. | |
| 8,606,483 B2 | 12/2013 | Krupadanam et al. | |
| 8,667,953 B2 | 3/2014 | Gallon et al. | |
| 8,701,628 B2 | 4/2014 | Tripathi et al. | |
| 8,839,766 B2 | 9/2014 | Serrano et al. | |
| 9,086,020 B2 * | 7/2015 | Pirjaberi | F02D 13/06 |
| 9,273,643 B2 | 3/2016 | Carlson et al. | |
| 9,328,672 B2 | 5/2016 | Serrano et al. | |
| 9,387,849 B2 | 7/2016 | Soliman et al. | |
| 9,399,964 B2 * | 7/2016 | Younkins | F01L 1/047 |
| 9,567,928 B2 | 2/2017 | Rayl et al. | |
| 9,573,594 B2 * | 2/2017 | Mitsuyasu | F16D 48/02 |
| 9,745,905 B2 | 8/2017 | Pirjaberi et al. | |
| 9,790,867 B2 | 10/2017 | Carlson et al. | |
| 10,167,799 B2 | 1/2019 | Serrano et al. | |
| 10,408,140 B2 | 9/2019 | Yuan et al. | |
| 10,494,971 B2 | 12/2019 | Younkins et al. | |
| 10,900,425 B2 | 1/2021 | Yuan et al. | |
| 2001/0011456 A1 | 8/2001 | Hagen et al. | |
| 2002/0116099 A1 | 8/2002 | Tabata | |
| 2002/0195087 A1 | 12/2002 | Dunsworth et al. | |
| 2003/0102175 A1 | 6/2003 | Wakashiro et al. | |
| 2003/0131820 A1 | 7/2003 | McKay et al. | |
| 2003/0230280 A1 | 12/2003 | Allston et al. | |
| 2004/0163866 A1 | 8/2004 | Sen et al. | |
| 2005/0109302 A1 | 5/2005 | Tetsuno et al. | |
| 2005/0182553 A1 | 8/2005 | Miller et al. | |
| 2005/0193980 A1 | 9/2005 | Doering | |
| 2005/0272560 A1 | 12/2005 | Doering et al. | |
| 2006/0032479 A1 | 2/2006 | Megli et al. | |
| 2006/0048734 A1 | 3/2006 | Kataoka et al. | |
| 2006/0196463 A1 | 9/2006 | Pallett et al. | |
| 2007/0051350 A1 * | 3/2007 | Pallet | F02D 41/222 123/688 |
| 2007/0062476 A1 | 3/2007 | Ota et al. | |

(56) References Cited

U.S. PATENT DOCUMENTS

| | | | |
|---|---|---|---|
| 2007/0062499 A1 | 3/2007 | Miyasuko et al. | |
| 2007/0131196 A1 | 6/2007 | Gibson et al. | |
| 2007/0234984 A1 | 10/2007 | Kolmanovsky et al. | |
| 2008/0041336 A1 | 2/2008 | Gibson et al. | |
| 2008/0066450 A1 | 3/2008 | Surnilla et al. | |
| 2008/0078593 A1 | 4/2008 | Ortmann et al. | |
| 2008/0173284 A1 | 7/2008 | Kavanaugh et al. | |
| 2010/0010724 A1 | 1/2010 | Tripathi et al. | |
| 2010/0012086 A1 | 1/2010 | Demura | |
| 2010/0012099 A1 | 1/2010 | Kerns et al. | |
| 2010/0043744 A1 | 2/2010 | Suzuki et al. | |
| 2010/0050993 A1* | 3/2010 | Zhao | F02D 41/0087 123/481 |
| 2010/0082220 A1 | 4/2010 | Whitney | |
| 2010/0100299 A1* | 4/2010 | Tripathi | F02D 41/0087 701/102 |
| 2010/0263636 A1 | 10/2010 | Kerns et al. | |
| 2011/0083639 A1* | 4/2011 | Gallon | F02D 41/0295 60/276 |
| 2011/0130902 A1 | 6/2011 | Heisei et al. | |
| 2011/0202262 A1 | 8/2011 | Gibson et al. | |
| 2011/0208405 A1 | 8/2011 | Tripathi et al. | |
| 2011/0213540 A1 | 9/2011 | Tripathi et al. | |
| 2011/0220068 A1 | 9/2011 | Ferch et al. | |
| 2011/0251773 A1 | 10/2011 | Sahandiesfanjani et al. | |
| 2012/0017868 A1 | 1/2012 | Rammer et al. | |
| 2012/0138005 A1 | 6/2012 | White et al. | |
| 2013/0000599 A1 | 1/2013 | Okamoto et al. | |
| 2013/0092127 A1 | 4/2013 | Pirjaberi et al. | |
| 2013/0096811 A1 | 4/2013 | Yamauchi et al. | |
| 2014/0041624 A1 | 2/2014 | Rayl et al. | |
| 2014/0045652 A1* | 2/2014 | Carlson | F02P 9/005 477/109 |
| 2014/0090623 A1* | 4/2014 | Beikmann | F02D 13/06 123/350 |
| 2014/0261309 A1* | 9/2014 | Chen | F02D 41/0235 123/320 |
| 2015/0013311 A1 | 1/2015 | Horst et al. | |
| 2015/0166037 A1 | 6/2015 | Bergkoetter et al. | |
| 2015/0191168 A1 | 7/2015 | Mitsuyasu | |
| 2015/0322869 A1* | 11/2015 | Shost | F02D 41/0087 123/481 |
| 2015/0345407 A1* | 12/2015 | Glugla | F02D 41/0087 123/406.47 |
| 2016/0040614 A1* | 2/2016 | Younkins | F02P 5/1512 123/335 |
| 2016/0053697 A1* | 2/2016 | Pirjaberi | F02P 5/1504 123/406.12 |
| 2016/0108835 A1 | 4/2016 | Kees et al. | |
| 2016/0115878 A1* | 4/2016 | VanDerWege | F02D 41/0087 123/333 |
| 2016/0121875 A1 | 5/2016 | Aikawa et al. | |
| 2016/0146121 A1* | 5/2016 | Carlson | F01N 11/007 60/276 |
| 2016/0290255 A1 | 10/2016 | Miyahara et al. | |
| 2017/0234253 A1 | 8/2017 | Serrano et al. | |
| 2017/0321617 A1 | 11/2017 | Kalluri et al. | |
| 2017/0342922 A1 | 11/2017 | Pirjaberi et al. | |
| 2017/0356375 A1 | 12/2017 | Glugla | |
| 2018/0046184 A1* | 2/2018 | Subramanian | F02D 11/105 |
| 2018/0106201 A1* | 4/2018 | Yuan | F02D 41/0087 |
| 2018/0156692 A1* | 6/2018 | Chen | F02D 41/0087 |
| 2018/0266347 A1* | 9/2018 | Fuschetto | F02D 41/0085 |
| 2019/0033170 A1 | 1/2019 | Dudar | |
| 2019/0184959 A1* | 6/2019 | Cao | B60W 10/06 |
| 2021/0001832 A1* | 1/2021 | Phillips | F02D 41/023 |

FOREIGN PATENT DOCUMENTS

| | | |
|---|---|---|
| CN | 102162401 | 8/2011 |
| CN | 10357438 | 9/2016 |
| EP | 1 396 624 | 5/2007 |
| JP | S60228771 | 11/1985 |
| JP | H06193477 | 7/1994 |
| JP | H0868459 | 3/1996 |
| JP | H08105335 | 4/1996 |
| JP | 2002-089307 | 3/2002 |
| WO | WO 2010/006311 | 1/2010 |
| WO | WO 2011/085383 | 7/2011 |
| WO | WO 2016/153837 | 9/2016 |

OTHER PUBLICATIONS

Japanese Office Action dated Oct. 7, 2021 from Japanese Application No. 2017-547499.
International Search Report dated Oct. 18, 2013 from International Application No. PCT/US2013/052577.
Written Opinion dated Oct. 18, 2013 from International Application No. PCT/US2013/052577.
International Search Report dated Nov. 1, 2013 from International Application No. PCT/US2013/054194.
Written Opinion dated Nov. 1, 2013 from International Application No. PCT/US2013/054194.
Chinese Office Action dated Jul. 27, 2015 from Chinese Application No. 201380041434.X.
International Search Report dated Jul. 15, 2016 from International Application No. PCT/US2016/022321.
Written Opinion dated Jul. 15, 2016 from International Application No. PCT/US2016/022321.
International Search Report and Written Opinion dated Sep. 18, 2018 from International Application No. PCT/US18/27307.
Chinese Office Action dated Oct. 23, 2018 from Chinese Application No. 201680017414.2.
Japanese Office Action dated Jan. 7, 2020 from Japanese Application No. 2017-547499.
European Search Report dated Jul. 14, 2020 from European Application No. 20158880.3.
European Search Report dated Jul. 2, 2020 from European Application No. 20158877.9.
Japanese Office Action dated Aug. 26, 2020 from Japanese Application No. 2017-547499.
Extended European Search Report dated Sep. 16, 2020 from European Application No. 18795112.4.
European Office Action dated Mar. 18, 2021 from European Application No. 20158877.9-1007.
European Office Action dated Nov. 8, 2021 from European Application No. 18 795 112.4-1007.
Chinese Office Action dated Nov. 25, 2021 from Chinese Application No. 201880028237.7.

\* cited by examiner

DECELERATION CYLINDER CUT-OFF

CROSS REFERENCE TO RELATED APPLICATIONS

This application is a Divisional of U.S. application Ser. No. 16/460,491 filed on Jul. 2, 2019, which is a Divisional of U.S. application Ser. No. 15/847,481, filed on Dec. 19, 2017 (now U.S. Pat. No. 10,408,140, issued Sep. 10, 2019), which is a Continuation-in-Part of U.S. application Ser. No. 15/584,686 filed May 2, 2017 (now U.S. Pat. No. 10,167, 799, issued Jan. 1, 2019), which is a Continuation-in-Part of U.S. patent application Ser. No. 15/009,533 filed Jan. 28, 2016 (now U.S. Pat. No. 9,790,867, issued Oct. 17, 2017), which claims priority to Provisional Application No. 62/137, 053 filed Mar. 23, 2015. U.S. application Ser. No. 15/009, 533 is also a Continuation-in-Part of application Ser. No. 13/961,701, filed Aug. 7, 2013 (now U.S. Pat. No. 9,273, 643, issued Mar. 1, 2016), which claims priority of Provisional Application No. 61/682,168, filed Aug. 10, 2012. U.S. application Ser. No. 15/009,533 is also a Continuation-in-Part of application Ser. No. 13/953,615, filed Jul. 29, 2013 (now U.S. Pat. No. 9,328,672, issued May 3, 2016), which claims priority of Provisional Application Nos. 61/677,888 filed Jul. 31, 2012 and 61/683,553, filed on Aug. 15, 2012. Each of these priority applications is incorporated herein by reference in their entirety.

FIELD

The present invention relates generally to control strategies for engine control in fuel and/or cylinder cut-off modes based on intake manifold absolute pressure.

BACKGROUND

Fuel economy is a major consideration in engine design. One fuel savings technique that is frequently used in automotive engines is referred to as deceleration fuel cut-off (DFCO—sometimes referred to as deceleration fuel shut-off, DFSO). This mode of operation is typically used during deceleration of an engine/vehicle, when no torque request is present (e.g., when the accelerator pedal is not depressed). During DFCO, fuel is not injected into the cylinders thereby providing a corresponding improvement in fuel economy.

Although deceleration fuel cut-off improves fuel efficiency, it has several limitations. Most notably, although fuel is not injected into the cylinders, the intake and exhaust valves still operate thereby pumping air through the cylinders. Pumping air through the cylinders has several potential drawbacks. For example, most automotive engines have emissions control systems (e.g. catalytic converters) that are not well suited for handling large volumes of uncombusted air. Thus, operation in a deceleration fuel cut-off mode for extended periods of time can result in unacceptable emissions levels. Therefore, operation in a DFCO mode is typically not permitted for extended periods of time and often involves undesirable emissions characteristics. Additionally, work is required to pump air through the cylinders, which limits the fuel savings.

In principle, the fuel savings associated with DFCO can be further improved by deactivating the cylinders such that air is not pumped through the cylinders when fuel is not delivered rather than simply cutting off the fuel supply. This cylinder deactivation approach may be referred to as deceleration cylinder cutoff (DCCO) rather than DFCO. Deceleration cylinder cutoff offers both improved fuel economy and improved emissions characteristics. The fuel economy improvement is provided in part by the reduction of losses due to pumping air through the cylinders. Fuel economy may be further improved by operating in DCCO mode for longer time periods than DFCO mode, since oxygen saturation of an exhaust system catalyst is less of an issue. The emissions improvement is due to the fact that large volumes of air are not pumped through the cylinders into the exhaust system during DCCO.

Although deceleration cylinder cutoff offers the potential of significant improvements in fuel economy and emissions characteristics, it involves a number of challenges that have hindered its commercial adoption. Indeed, the applicants are not aware of DCCO being used in commercial vehicle applications. Therefore, improved engine control strategies that facilitate the use of deceleration cylinder cutoff would be desirable. The present application describes techniques and control strategies that facilitate the use of deceleration cylinder cutoff.

SUMMARY

Controllers and methods for managing transitions into and/or out of a cylinder cut off mode are described. In some embodiments, a skip fire based transition into a cylinder cut off mode is used in which the fraction of working cycles that are fired is gradually reduced to a threshold firing fraction. Once the threshold firing fraction has been reached, all of the working chambers are deactivated.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

A number of control strategies for supporting deceleration cylinder cut-off during operation an internal combustion engine are described.

As suggested in the background, there are several challenges associated with implementing deceleration cylinder cutoff. One such challenge is associated with intake manifold pressure. Specifically, when all of the cylinders are de-activated, no air is withdrawn from the intake manifold. At the same time, leakage around the throttle and intake system will cause the manifold to fill towards barometric pressure. Therefore, when the cylinders are reengaged, more torque may be provided by each cylinder firing than desired which can result in undesirable NVH (noise, vibration and harshness) characteristics. One potential way to address the NVH effects is to transitorily retard the spark in a manner that reduces the engine output enough to mitigate the NVH concerns. Although this approach can work, it has the drawback of wasting fuel during the cylinder firing opportunities in which spark retard is used.

In one aspect, Applicants propose another approach that can help mitigate transitional NVH issues during transitions from a DCCO (cylinder cut-off) mode to an operational mode. Specifically, as the transition is made from a DCCO (cylinder cut-off) mode to an operational mode, some or all of the cylinders are briefly activated to pump air before they are fueled and fired. Pumping air through the cylinders can be used to draw down the manifold pressure to a desired level before the targeted operation is initiated. This can be thought of as transitioning from a DCCO (cylinder cut-off) to a DFCO (fuel cut-off) mode before transitioning to a cylinder firing mode. Reducing the manifold pressure before resuming firings can help improve the NVH characteristics associated with the transition while reducing or sometimes even eliminating the need to utilize more wasteful techniques such as spark retard.

Figure 1:
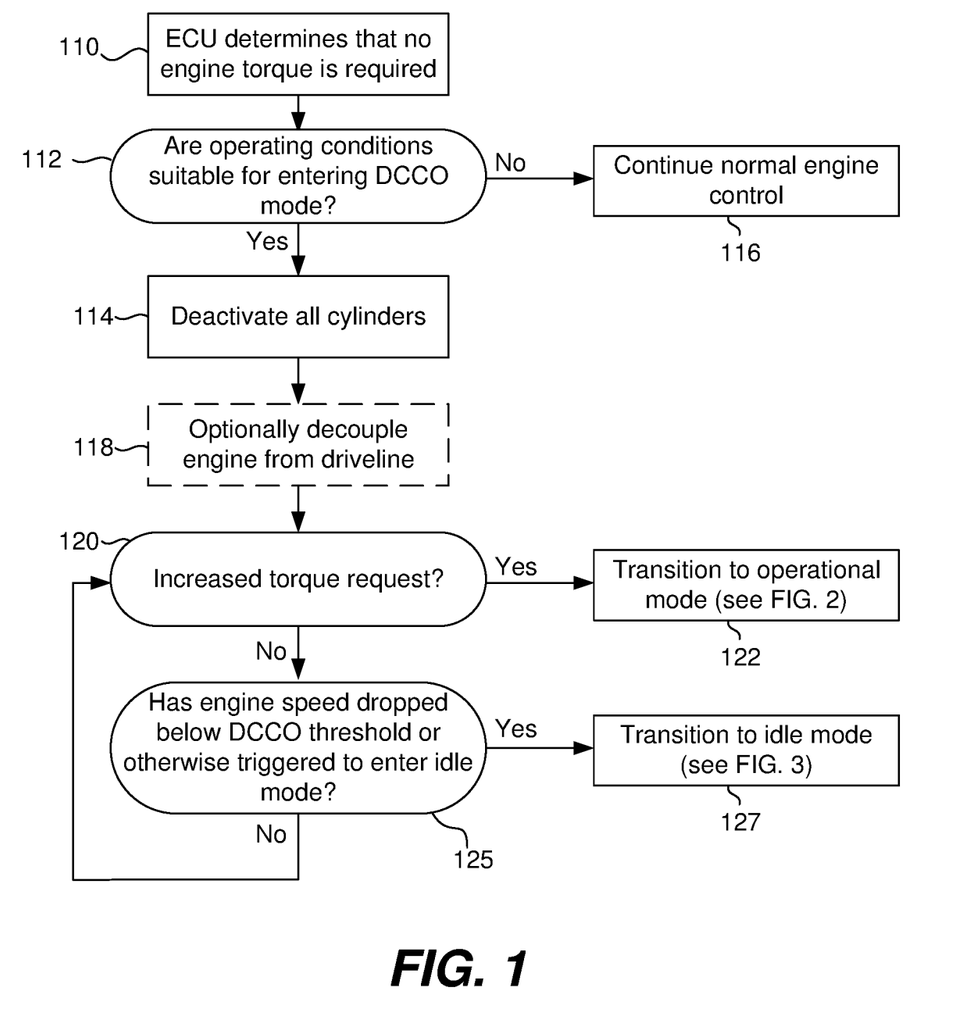
FIG. 1 is a flow chart illustrating a method implementing cylinder cut-off in accordance with a nonexclusive embodiment of the present invention.

Referring next to the flow chart of FIG. 1, a method of implementing DCCO will be described. Initially, during operation of an engine, the engine controller (e.g., a power train control module (PCM), an engine control unit (ECU), etc.) determines that cylinder cutoff is appropriate based on current operating conditions as represented by boxes 110, 112. A common scenario that leads to the determination that cylinder cutoff is appropriate is when the driver releases the accelerator pedal (sometimes referred to as accelerator "tip-out"), which frequently occurs when the driver desires to slow down (this use case has lead to the use of phrase "deceleration" cylinder cutoff—DCCO). Although deceleration tends to be one of the most common trigger for entering a cylinder cutoff mode, it should be appreciated that cylinder cutoff (referred to as DCCO) may be appropriate in a variety of other circumstances as well, as for example: (a) when the accelerator pedal is released while the vehicle is traveling downhill regardless of whether the vehicle is accelerating or decelerating; (b) during transmission shift events or other transitory events where it may be desirable to transitorily reduce the net engine torque; etc. Generally, the engine control designer may specify any number of rules that define the circumstances in which DCCO is, or is not, deemed appropriate.

Most scenarios in which DCCO is appropriate correspond to circumstances where engine torque is not required to drive the vehicle. Therefore, the flowchart of FIG. 1 begins at 110 where an initial determination is made that no engine torque is required. When no torque is required the logic determines whether operating conditions are suitable for entering a DCCO mode in step 112.

It should be appreciated that there may be a number of no engine torque operating conditions in which it might not be desirable to go into DCCO mode. For example, in most non-hybrid engines, it is desirable to keep the crankshaft rotating at some minimum speed (e.g. at an idle speed) while the vehicle is being operated. Therefore, the engine operating rules may dictate that a DCCO mode will only be entered when the crankshaft is spinning at speeds above a designated DCCO entry engine speed threshold thereby preventing entry into the DCCO mode when the engine is operating at an idle or near idle engine speed. Similarly, in many applications it may not be possible to fully decouple the crankshaft from the driveline. Thus, the engine operating rules may dictate that the DCCO mode may not be entered when the vehicle is stopped or moving slowly—e.g., traveling a speed lower than a DCCO entry threshold vehicle speed—which may vary as a function of gear or other operating conditions. In another example, DCCO may not be appropriate when engine braking is desired, as may be the case when the driver is braking and/or driving in a lower gear. In yet another example, DCCO may be inappropriate while certain diagnostic tests are being performed. DCCO operation may also be undesirable (or specifically desirable) during certain types of traction control events, etc. It should be appreciated that these are just a few examples and there are a wide variety of circumstances in which DCCO may be deemed appropriate or inappropriate. The actual rules defining when DCCO operation is and is not appropriate can vary widely between implementations and are entirely within the discretion of the engine control designer.

In the flowchart, the no engine torque and DCCO entry determinations are illustrated as being distinct steps. However, it should be appreciated that there is no need for these decisions to be distinct. Rather the amount of torque required at any particular time may simply be part of the rules determining when DCCO operation is deemed appropriate.

If entering a DCCO mode is deemed appropriate, all of the cylinders are deactivated as represented by box 114. Alternatively, if DCCO engine operation is not appropriate at the present time, then the DCCO mode is not entered and the engine may be controlled in a conventional manner as represented by box 116.

When the DCCO mode is entered, there are several ways that the cylinders may be deactivated. In some circumstances, each of the cylinders is deactivated in the next controllable working cycle after the decision to enter a DCCO mode is made (i.e., effective immediately). In other circumstances, it may be desirable to more gradually ramp the firing fraction down to DCCO using a skip fire approach in which some working cycles are fired and other working cycles are skipped. The skip fire ramp down approach works well when the engine is transitioning from a skip fire mode to a DCCO mode. However, it should be appreciated that the skip fire ramp down approach can also be used to facilitate transitioning to DCCO from "normal" all cylinder operation of an engine, or to DCCO from a variable displacement mode with a reduced displacement is being used (e.g., when operating using 4 of 8 cylinders, etc.).

When a gradual transition is utilized, the firing fraction may be gradually reduced until a threshold firing fraction is reached, at which point all of the cylinders may be deactivated. By way of example, firing fraction thresholds in the range of 0.12 to 0.4 are believed to work well for most ramping type applications. During the gradual reduction, the working chambers associated with skipped working cycles are preferably deactivated during the skipped working cycles—although this is not a requirement. If the engine is operating in a skip fire mode at a firing fraction below the firing fraction threshold when the DCCO mode entry decision is made, then all of the cylinders can be deactivated in their next respective working cycles.

There are times when it may be desirable to decouple the crankshaft from the transmission or other portion of the driveline. Therefore, when the DCCO mode is entered, the power train controller may optionally direct a torque converter clutch (TCC) or other clutch or driveline slip control mechanism to at least partially decouple the crankshaft from the transmission to reduce the coupling between vehicle speed and engine speed as represented by box 118. The extent of the decoupling that is possible will tend to vary with the specific driveline slip control mechanism(s) that is/are incorporated into the powertrain. There are a number of operating conditions where it may be desirable to mechanically decouple the engine from the drive line. For example, decoupling is desirable when the vehicle speed is zero, but the engine speed is not. During deceleration is may also be desirable to decouple the engine from the driveline, especially when a brake is being used. Other conditions such as transmission shifts also frequently benefit from decoupling the engine from the driveline.

A characteristic of DCCO (cylinder cutoff) is that the engine has less resistance than it would during DFCO (fuel cutoff) due to the reduction of pumping losses. In practice, the difference is quite significant and can readily be observed when the engine is effectively disengaged from the transmission. If permitted, DFCO pumping losses would cause many engines to slow to a stop within a period on the order of a second or two at most, whereas the same engine may take 5-10 times as long to slow to a stop under DCCO (cylinder cutoff). Since DFCO arrests the engine quite quickly, it is common to keep the drive train engaged during DFCO, which means that the engine tends to slow with the vehicle and the pumping losses associated with DFCO contribute to engine braking. In contrast, when DCCO is used, the engine can be disengaged from the transmission to the extent permitted by the drive train components (e.g., a torque converter clutch (TCC), a dual-clutch transmission, etc.). In practice, this allows DCCO to be used for much longer periods than DFCO in certain operating conditions.

The engine remains in the DCCO mode until the ECU determines that it is time to exit the DCCO mode. The two most common triggers for exiting the DCCO mode tend to be either when a torque request is received or when the engine slows to a speed at which idle operation is deemed appropriate. Further reduction in engine speed may result in an undesired engine stall, so the engine is placed in idle operation to avoid stalling. Often, a torque request is caused by the accelerator pedal being depressed (sometimes referred to herein as accelerator tip-in). However, there may be a variety of other scenarios that require torque that are independent of accelerator pedal tip-in. For example, these types of scenario may occur when accessories such as an air conditioner, etc. require torque. Many vehicle air conditioners are activated by engagement of an air conditioner clutch to the vehicle power train, placing an additional torque load on the engine.

In one embodiment, if a request for an accessory torque load is received during DCCO operation mode, that request is denied until DCCO mode operation is completed. A key advantage of prohibiting engagement of an accessory, such as an air conditioner, during DCCO is that torque demand on the engine will continue to be zero during the DCCO period. The air conditioner can be engaged as soon as the engine is no longer in DCCO mode without impact vehicle occupant comfort. This preserves engine speed without prematurely shifting the engine out of DCCO mode. A key advantage of allowing continued DCCO operation is that fuel economy may be improved.

In another embodiment, a request for an accessory torque load, such as air conditioner engagement, may result in termination of DCCO mode. In this embodiment, the actual increase in the engine load, such as the engagement of the air conditioner clutch, may be slightly delayed to allow time to smoothly transition out of DCCO using the methods described herein. By appropriately adjusting the engine parameters in advance of air conditioner engagement, an undesired change in brake torque can be avoided. Alternatively, in some embodiments the vehicle torque converter may be locked in anticipation of or coincident with the addition of an auxiliary load. In this case vehicle momentum will assist in powering the auxiliary load so that engine speed may be maintained while in DCCO mode.

In another embodiment, a request for an accessory torque load may result in setting a timer that will terminate DCCO mode after a fixed time period, for example 10 or 20 seconds. Since most DCCO mode operational periods will be less than 10 or 20 seconds, this embodiment will generally allow DCCO operation to continue without premature termination. This embodiment may be useful in cases such as going down an extended downhill slope, where vehicle occupants may become uncomfortable if the vehicle air conditioner remains off for extended periods.

When a request for increased torque is received (as indicated by box 120), the engine transitions to an operational mode that delivers the desired torque as represented by box 122. Alternatively, if the engine speed slows below a DCCO threshold or the engine is otherwise triggered to enter an idle mode (as indicated by box 125), the engine transitions to an idle mode as represented by box 127.

As discussed above, when all of the cylinders are deactivated, no air is withdrawn from the intake manifold. At the same time, leakage around the throttle and intake system will cause the manifold to fill towards barometric pressure. Therefore, when the cylinders are reengaged, more torque may be provided by each cylinder firing then desired which can result in undesirable NVH (noise, vibration and harshness) characteristics. This is a particular concern when transitioning to an idle mode or other mode in which relatively little power is required. Thus, for example, when transitioning out of DCCO mode into an idle mode, it is often desirable to reduce the manifold pressure to a target pressure more suitable for initiating idle operation. This can be accomplished by opening the intake and exhaust valves during a set of working cycles to thereby draw air out of the intake manifold and pass such air out through the exhaust unburnt. This is sometimes referred to herein as a DFCO working state because it contemplates pumping of air through the cylinders without injecting fuel into the cylinders as typically occurs during DFCO operation.

The actual target air pressure to initiate idle operation will vary in accordance with the design goals and needs for any particular engine. By way of example, target manifold pressures in the range of approximately 0.3 to 0.4 bar are appropriate for transitioning to idle in many applications.

The number of DFCO working cycles that would be required to reduce the manifold pressure to any given target pressure will vary with a variety of factors including the initial and target manifold pressures, the size of the intake manifold relative to the cylinders, and the rate of air leakage past the throttle. The manifold and cylinder sizes are known, the air leakage past the throttle can readily be estimated and the current intake manifold pressure can be obtained from an intake manifold pressure sensor. Therefore, the number of working cycles required to reduce the manifold pressure to a given target pressure can readily be determined at any time. The engine controller can then activate the cylinders to pump air for the appropriate number of working cycles.

Transitions to operating conditions other than idle can be handled in much the same manner except the target manifold pressure may be different based on the torque request and potentially various current operational conditions (e.g., engine speed, gear, etc.). When higher manifold pressures are desired, less DFCO pumping is required to attain the desired manifold pressure.

Although the actual number of working cycles that are appropriate to pump down the manifold pressure to the desired level will vary, typical scales are on the order of 1 to 4 engine cycles and more preferably 1 to 2 engine cycles. (In a 4-stroke engine, each engine cycle constitutes two revolutions of the crankshaft). Thus, the manifold pressure reduction can typically be accomplished quite quickly (e.g. within 0.1 or 0.2 seconds) even when an engine is approaching idle speeds. Such a response is quite adequate in many operating situations.

There may be times when a faster response to a torque request is desired and it may be desirable to begin delivering torque before the manifold pressure can be reduced to a desired level using pure DFCO. There are several ways that a faster response can be provided. For example, when torque is first requested, the engine can initially be operated in a skip fire mode in which air is pumped through the cylinders during skipped working cycles rather than deactivating the skipped cylinders. In other cases, a transitional mode where some cylinders are firing, some are deactivated, and some are pumping air may be used. This has an advantage of providing quick response by starting to fire earlier and the benefit of reducing the overall level of oxygen pumped to the catalyst by not pumping through all non-firing cylinders at the same time. The actual decisions to fire/deactivate/pump depend on the level and urgency of the torque request.

Meeting the initial torque request using skip fire operation tends to reduce the initial torque impulse and corresponding harshness of the transition, and pumping air during skipped working cycles helps quickly reduce the manifold pressure. Alternatively, somewhat similar benefits may be obtained by activating and firing one fixed set of cylinders while pumping air through a second set of cylinders (which can be thought of as operating the second set of cylinders in a DFCO mode).

When desired, the torque output of the fired cylinders can be further mitigated as desired using spark retard or other conventional torque reduction techniques.

It should be appreciated that DCCO mode operation can be used in hybrid vehicles, which use both an internal combustion engine and electric motor to supply torque to the drive train. Use of DCCO operation mode allows more torque to be devoted to charging a battery that can power the electric motor. Energy from the battery may also be used to drive an accessory, such as an air conditioner, so operation of the air conditioner will not impact DCCO mode operation. DCCO mode operation may also be used in vehicles having start/stop capabilities, i.e. where the engine is turned off automatically during a drive cycle. In the latter case, DCCO mode operation may be maintained at engine idle or lower engine speeds, since there is no longer a requirement to maintain continuous engine operation.

The transition control rules and strategies used to transition from a DCCO mode to normal torque delivery mode can vary widely based on both the nature of the torque request and NVH/performance tradeoffs selected by the engine designer. Some representative transition strategies are discussed below with reference to flow charts of FIG. 2.

The transition strategy may vary based significantly based on the nature of the torque request. For example, when the driver presses heavily on the accelerator pedal (sometimes referred to herein as "pedal stomp"), it might be presumed that immediate torque delivery is of highest importance and transitory NVH concerns may be deemed less of a concern. Thus, when the torque request is responsive to pedal stomp, the controller may activate all of the cylinders at the earliest available opportunity and immediately operate the cylinders at full (or maximum available) power as represented by boxes 305 and 308 of FIG. 2.

Figure 2:
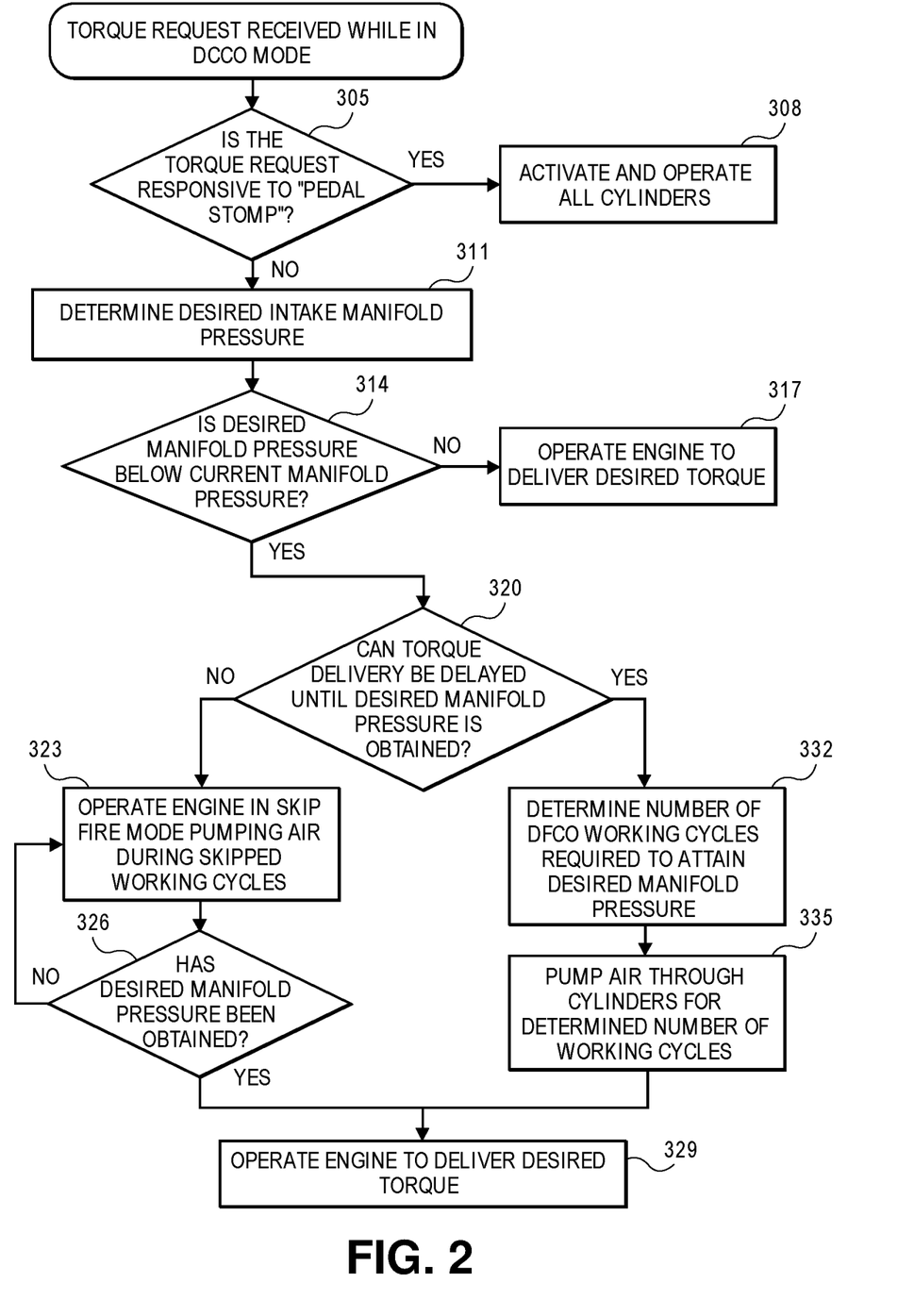
FIG. 2 is a flow chart illustrating a nonexclusive method of transitioning out of a DCCO mode to an operating mode.

The controller also determines a desired intake manifold pressure as represented by box 311. The desired pressure may then be compared to the actual (current) manifold pressure as represented by box 314. Due to the throttle leakage problem described above, the current manifold pressure will very often (but not always) be above the desired manifold pressure. If the current manifold pressure is at or lower than the desired manifold pressure, then the cylinders may be activated as appropriate to deliver the desired torque. When the engine controller supports skip fire engine operation, the torque may be delivered using skip fire control or using all cylinder operation, whichever is appropriate based on the nature of the torque request as represented by box 317. Alternatively, if the current manifold pressure is above the desired manifold pressure, then some of the described transitions techniques can be employed as represented by the "Yes" branch descending from box 320.

As described above, the manifold pressure can be drawn down by pumping air through some or all of the cylinders. NVH issues can typically be mitigated by reducing the manifold pressure to the desired level before firing any cylinders. However, waiting for the manifold pressure to be reduced by pumping air through the cylinders inherently introduces a delay in the torque delivery. The length of the pumping delay will vary as a function of both current engine speed and the differential between the current and desired manifold pressure. Typically, the delays are relatively short, so in many circumstances, it may be appropriate to delay the torque delivery until the manifold pressure has been reduced to the target level by pumping air through one or more of the cylinders as represented by the "Yes" branch descending from box 320. In other circumstances, it may be desirable to begin torque delivery as soon as possible. In such circumstances, the engine can be operated in a skip fire mode to deliver the desired torque, while pumping air through the cylinders during skipped working cycles until the manifold pressure is reduced to the desired level as represented by box 323. Once the desired manifold pressure is attained (represented by check 326), the desired torque can be delivered using any desired approach, including all cylinder operation, skip fire operation, or reduce displacement operation as represented by box 329. When skip fire operation is used to deliver the desired torque, the cylinders are preferably deactivated during skipped working cycles once the desired manifold pressure is attained.

It should be apparent that an advantage of using skip fire operation during the transition is that the desired level of torque can be delivered without requiring, or reducing the need to use, fuel inefficient techniques such spark retard to reduce the engine's torque output. Pumping air through cylinders during skipped working cycles has the advantage of more quickly reducing manifold pressure than would occur using skip fire with cylinder deactivation during skipped working cycles.

It should be appreciated that the described skip fire with air pumping approach can be coupled with other torque management strategies to further reduce NVH issues when appropriate. For example, in engines that facilitate variable valve lift, the valve lift can be modified in conjunction with the skip fire/air pumping to further reduce NVH concerns. In another example, spark retard can also be used when appropriate to further manage torque delivery. Therefore, it should be apparent that skip fire with air pumping is a tool that can be utilized in a wide variety of applications and in conjunction with a wide variety of other torque management strategies to help mitigate NVH concerns when transitioning out of DCCO operation.

Although skip fire operation is primarily described, it should be appreciated that somewhat similar benefits can be obtained using a variable displacement type approach in which a first set of cylinders are operated (fired) and a second set of cylinders pump air during the transition. In still other embodiments, a first set of cylinder can be operated in a skip fire mode (during the transition) while a second set of cylinders pump air during the transition. That is, the cylinders in the skip fire set may be selectively fired and selectively skipped through the transition—with or without air pumping through the skipped cylinders in that set.

Returning to box 320, there may be times when torque delivery can be delayed sufficiently such that the intake manifold pressure air can be reduced to the desired level by pumping air through one or more of the cylinders before torque deliver begins as represented by the "Yes" branch from box 320. In this case, the controller can determine the number of pumping cycles (referred to as "DFCO working cycles" in box 332). Air is then pumped through one or more of the cylinders for the determined number of working cycles as represented by box 335 at which point the engine can be operated as desired to deliver the desired torque.

Although the flowchart of FIG. 2 illustrates DFCO pumping and skip fire w/air pumping as separate paths, it should be appreciated that in other circumstances, the two approaches can be used together (and/or in conjunction with other torque management schemes) in various hybrid approaches. For example, in some circumstances, it may be desirable to pump air through all of the cylinders for a short period (e.g. for one engine cycle) and thereafter operate in the skip fire with air pumping mode until the manifold pressure is reduced to the desired level. Such an approach can shorten the delay until torque delivery begins, while possibly mitigating certain NVH effects as compared to immediately entering the skip fire with air pumping mode.

As will be appreciated by those familiar with the art, pumping large volumes of air through an engine can saturate the catalytic converter thereby raising potential emissions concern. Therefore, in some circumstances, emissions concerns may limit the number of air pumping working cycles that can be used during the transition from DCCO operation to the desired operational state—similarly to the way emissions concerns currently limit the use of decel fuel cut-off (DFCO). However, it should be apparent that in virtually all cases, the use of DCCO as opposed to DFCO will prolong the period in which fuel is not needed, thereby improving fuel efficiency. The described skip fire with air pumping approach has the additional advantage of reducing the number of skipped working cycles that are needed to reduce the intake manifold pressure to the desired level, since the fired working cycles typically draw substantially the same amount of air as air pumping working cycles.

In some of the described embodiments, the controller predetermines the number of air pumping (and or fired) working cycles required to reduce the manifold pressure to a desired level. This is very practical since the manifold filling and drawdown dynamics can relatively easily be characterized. In some embodiments, the appropriate number of air pumping working cycles and/or skip fire with air pumping transition sequence suitable for use given any current and target engine state can be found through the use of look-up tables. In other embodiments, the required number of air pumping working cycles and/or skip fire with air pumping transition sequence can be calculated dynamically at the time of a transition. In still other embodiments, predefined sequences can be used to define the appropriate DFCO delay or skip fire with air pumping transition sequence.

Figure 3:
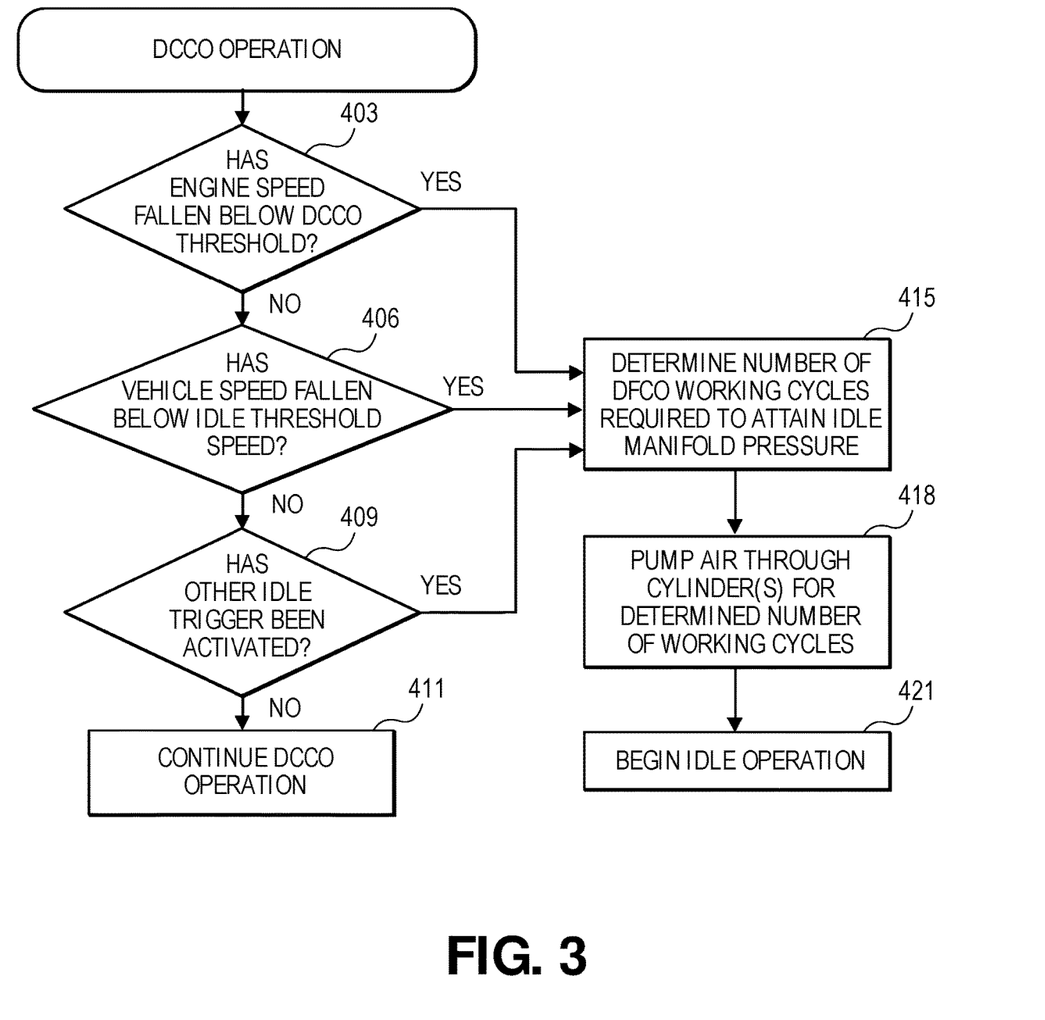
FIG. 3 is a flow chart illustrating a nonexclusive method of transitioning out of a DCCO mode to an idle mode.

Transitioning from DCCO to idle operation can often be thought of as a special case of a torque request. FIG. 3 is a flow chart that illustrates a non-exclusive method of transitioning from DCCO to idle. As discussed above, there are a number of different triggers that may initiate a transition from DCCO to idle. One common trigger is when the engine speed falls below a DCCO exit threshold as represented by box 403. In some implementations, another trigger may be based on vehicle speed as represented by box 406. In different implementations, there may be a variety of other idle triggers as well, as represented by box 409. In general, DCCO operation will continue until a transition trigger is reached or the engine is turned off as represented by box 411.

Typically, when a transition to idle is commanded the controller will have time to pump the intake manifold down to the desired idle manifold pressure before any cylinder firing begins. Therefore, in the illustrated embodiment, when an idle transition triggers, the control logic determines the number of air pumping working cycles are required to reduce the manifold pressure to the desired target pressure as represented by box 415. In some embodiments, a lookup table can be used to define the number of air pumping working cycles based on one or two simple indices such as current manifold pressure and/or engine speed. The cylinders are then activated to pump air for the designated number of working cycles to reduce the manifold pressure to the desired level as represented by box 418. Thereafter, the engine may transition to a normal idle operating mode as represented by box 421.

In other embodiments, a default of a fixed number of air pumping working cycles can be used any time a transition from DCCO to idle is commanded unless specified criteria are not met.

As mentioned above, the applicant has developed a dynamic skip fire engine control technology that is well-suited for improving the fuel efficiency of internal combustion engines. In general, skip fire engine control contemplates selectively skipping the firing of certain cylinders during selected firing opportunities. Thus, for example, a particular cylinder may be fired during one firing opportunity and then may be skipped during the next firing opportunity and then selectively skipped or fired during the next. Skip fire engine operation is distinguished from conventional variable displacement engine control in which a fixed set of cylinders are deactivated substantially simultaneously during certain low-load operating conditions and remain deactivated as long as the engine maintains the same displacement. In conventional variable displacement control, the sequence of specific cylinders firings will always be exactly the same for each engine cycle so long as the engine remains in the same displacement mode, whereas that is often not the case during skip fire operation. For example, an 8-cylinder variable displacement engine may deactivate half of the cylinders (i.e. 4 cylinders) so that it is operating using only the remaining 4 cylinders. Commercially available variable displacement engines available today typically support only two or at most three fixed mode displacements.

In general, skip fire engine operation facilitates finer control of the effective engine displacement than is possible using a conventional variable displacement approach because skip fire operation includes at least some effective displacements in which the same cylinder(s) are not necessarily fired and skipped each engine cycle. For example, firing every third cylinder in a 4 cylinder engine would provide an effective displacement of ⅓rd of the full engine displacement, which is a fractional displacement that is not obtainable by simply deactivating a set of cylinders.

With dynamic skip fire, firing decisions may be made on a firing opportunity by firing opportunity basis, as opposed to simply using predefined firing patterns. By way of example, representative dynamic skip fire controllers are described in U.S. Pat. Nos. 8,099,224 and 9,086,020, both of which are incorporated herein by reference.

When operating in a skip fire mode, the cylinders are generally deactivated during skipped working cycles in order to reduce pumping losses; however, as previously discussed, there are certain cases where a skipped working cycle may pump air. Therefore, engines configured to operate in a dynamic skip fire mode preferably have hardware suitable for deactivating each of the cylinders. This cylinder deactivation hardware can be used to help support the described deceleration cylinder cutoff.

The applicant has previously described a variety of skip fire controllers. A skip fire controller 10 suitable for implementing the present invention is functionally illustrated in FIG. 4. In this particular embodiment, the controller 10 is arranged to control the operation of an engine 80 having a multiplicity of working chambers or cylinders 82. As is well known in the art, an air intake manifold 84 is provided to supply air via air supply 88 to the working chambers 82 of the engine 80 during operation. A throttle plate 89 controls air flow from the atmosphere into the intake manifold 84. During DCCO operation the throttle may be closed to minimize air leakage into the intake manifold. The manifold 84 further includes a pressure sensor 86 that is provided to measure the actual air pressure in the manifold (MAP) and provide the measured pressure value to the controller 10.

Figure 4:
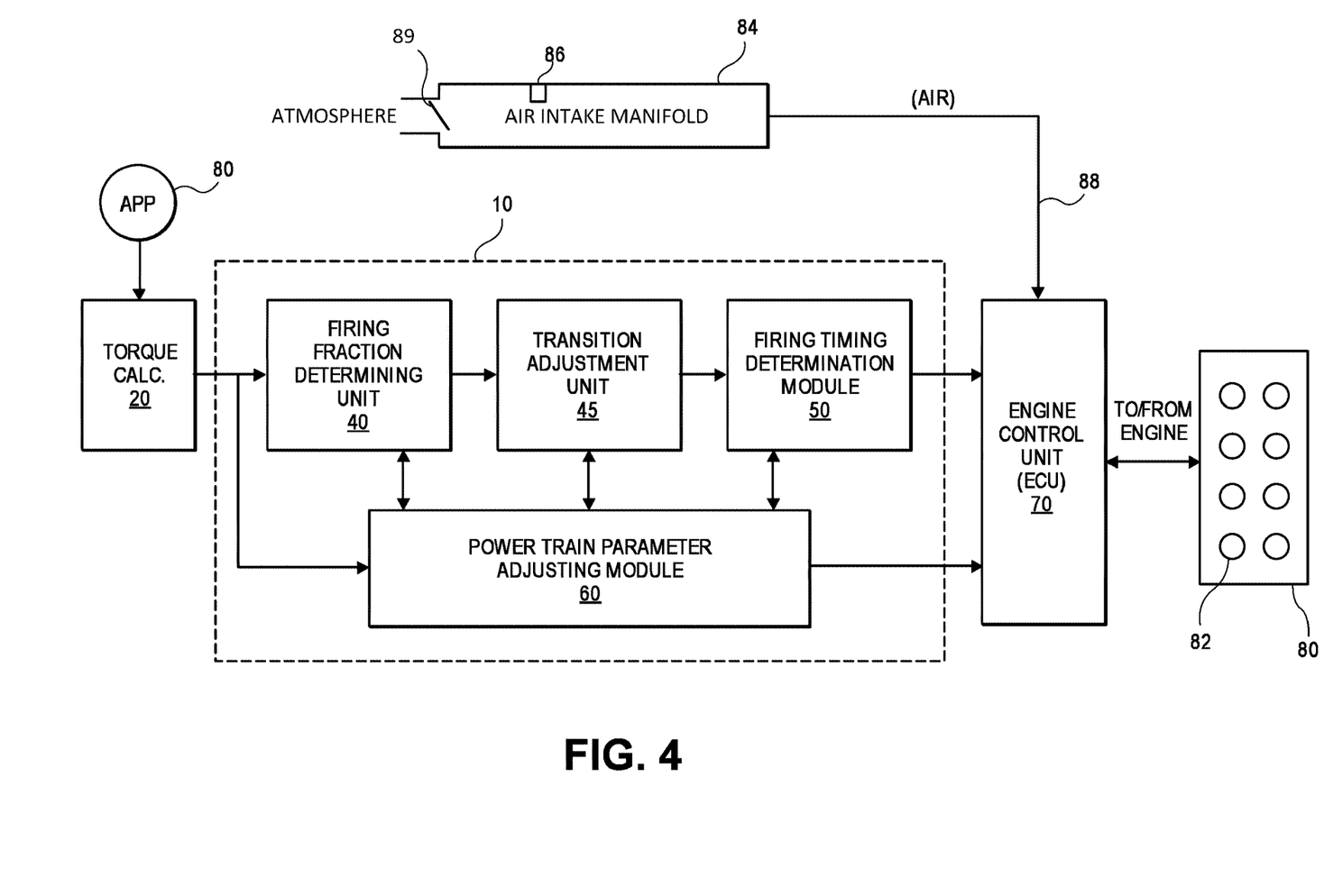
FIG. 4 is a functional block diagram of a skip fire controller and engine controller suitable for use in conjunction with a nonexclusive embodiment of the present invention that incorporates skip fire control.

In the particular embodiment shown, the engine 80 has eight working chambers 82. By no means should the number of chambers shown be construed as limiting. The various embodiments and principles of the present invention, as contemplated herein, may be used in cooperation with an engine 80 having any number of working chambers 82.

The illustrated skip fire controller 10 includes a torque calculator 20, a firing fraction determining unit 40, a transition adjustment unit 45, a firing timing determination unit 50, and a power train parameter adjusting module 60. The torque calculator 20 may obtain a driver requested torque via an accelerator pedal position (APP) sensor 80. For the purposes of illustration, skip fire controller 10 is shown separately from engine control unit (ECU) 70, which orchestrates the actual engine setting. However, it should be appreciated that in many embodiments the functionality of the skip fire controller 10 may be incorporated into the ECU 70. Indeed incorporation of the skip fire controller into an ECU or power train control unit is expected to be a common implementation.

The control methods described above with respect to FIGS. 1-3 and FIGS. 5, 6A-6D as described below are arranged to be directed by the ECU. The skip fire transitions and operation may be directed by skip fire controller 10.

A feature of DCCO mode operation is that there is little air flow into the intake manifold, since the throttle plate 89 may be closed and all engine cylinders deactivated. This engine condition provides unique conditions to conduct engine diagnostics. In particular, air leakage due to breaks in the air intake system can be diagnosed by monitoring the rate of change in MAP with the throttle blade closed and all cylinders deactivated. Increases in the rate of change in the MAP, i.e. the intake manifold filling quicker than anticipated, are indicative of air intake system leakage. When it is determined that the intake manifold is filling quicker than expected, a diagnostic error code or other suitable warning signal can be supplied to the engine controller, an engine diagnostics module or other suitable device.

DCCO mode also provides a diagnostic window to verify correct valve deactivation. Correctly operating DCCO mode halts all gas flow from the engine through the exhaust system. Should a cylinder fail to deactivate, air will be pumped into the exhaust system. Excess oxygen in the exhaust system, associated with the uncombusted air pumping through a cylinder, may be detected by an exhaust system oxygen monitor. When such excess oxygen is detected in the exhaust system, a diagnostic error code or other suitable warning signal can be supplied to the engine controller, an engine diagnostics module or other suitable device.

Another diagnostic that can be performed during DCCO mode is testing the exhaust system for leaks. In the presence of an exhaust system leak, the oxygen sensor would sense increased oxygen levels during DCCO. The magnitude of the oxygen level increase would likely be smaller than that associated with a cylinder deactivation failure. Its event timing behavior would also be different, since an exhaust system leak would have a continuous oxygen inflow whereas a pumping cylinder will only introduce oxygen into the exhaust system during the cylinder exhaust stroke. Thus by analyzing the time behavior of the sensed oxygen level, relative to a baseline value, an exhaust system leak can be distinguished from a cylinder deactivation failure. When such an exhaust leak is detected, a diagnostic error code or other suitable warning signal can be supplied to the engine controller, an engine diagnostics module or other suitable device.

Detection of any of these failures, air leakage into the air intake system, air leakage into the exhaust system, or cylinder deactivation failure may optionally be signaled to a driver by an indicator, so he/she is aware of the problem and can take appropriate corrective action. As discussed above, during DCCO operation, no air is pumped out of the manifold 84. As a result, the air pressure will often drift upward toward barometric, or equivalently atmospheric, pressure. To alleviate the problem of a large cylinder air charge when a subsequent torque request is made, the DFCO mode is used to pump down the air pressure in the manifold 84 before torque delivery. This technique significantly improves NVH. Several issues arise with this approach however. First, fuel may be required to recondition the catalytic converter in the exhaust system after pumping air in the DFCO mode. Second, the pressure in the manifold 84 may be low enough that no pumping is required, meaning intervening operation in the DFCO mode is not actually needed. Third, torque generation is delayed until after the DFCO mode is complete. While this often is not a problem, when an urgent torque request is made engine responsiveness is critical. Fourth, at low manifold pressures, operation in DFCO may cause undesirable engine braking.

The Applicants have found, as described in the various embodiments below, that air pressure measurement by the sensor 86 in the air intake manifold 84 can be used to determine the number of DFCO mode working cycles that are required to reduce the manifold pressure to a threshold level. Since the working cycle duration is based on the known engine speed, the timing for terminating DFCO operation can be determined or calculated. In other words, the air pressure in the manifold 84 as measured by the sensor 86 can be used to define the duration of the DFCO operation and/or when to terminate DFCO operation in terms of either a number of DFCO working cycles or a time for DFCO operation.

Figure 5:
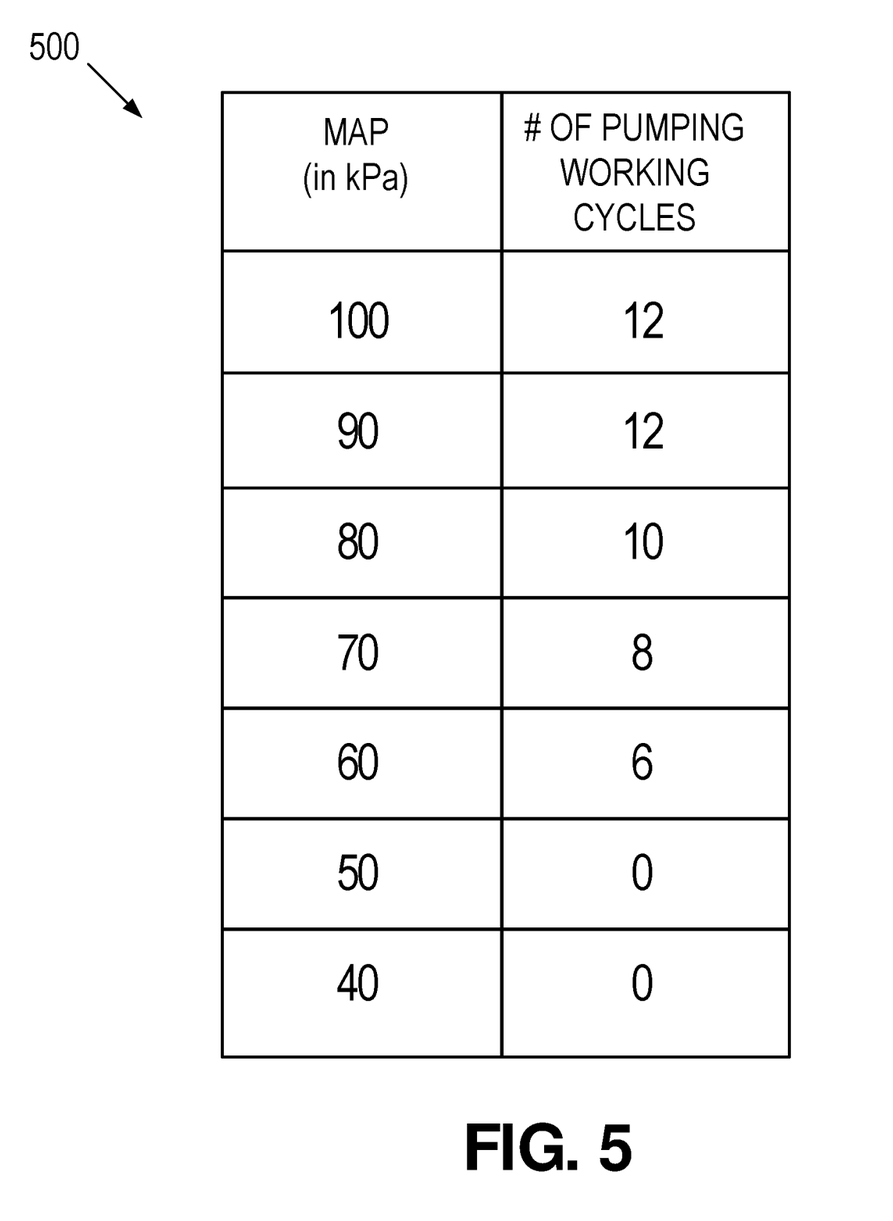
FIG. 5 is a look up table providing a number of pumping working cycles for different intake manifold pressure values in accordance with a non-exclusive example of the present invention.

Referring to FIG. 5, a look up table 500 providing a number of pumping working cycles for reducing different intake manifold absolute pressure values to a threshold level is shown. In this particular embodiment, various manifold absolute pressure ("MAP") values are provided in the left column in ten kPa increments from 40 to 100, whereas the number of chamber pumping working cycles needed to reduce the pressure in the manifold 84 to the threshold is provided in the right column. In this particular example, the specified number of chamber pumping cycles is (0, 0, 6, 8, 10, 12 and 12) for kPa increments from 40 to 100 respectively. In other words, for the "threshold" in this example is 50 kPa, and at MAP values at this pressure level or less, no chamber pumping working cycles are required. On the other hand, for MAP values greater than 50 kPa, multiple chamber pumping working cycles are needed to pump the air pressure in the manifold 84 down to the threshold or some other desirable pressure level target. In one particular embodiment, the chamber pumping working cycles are realized by operating working chambers 82 or cylinders of engine 80 in the DFCO mode. It should be understood that DFCO operation is merely an option and that any engine operation that results in pumping of air through working chamber(s) may be used. For example, a small amount of fuel may be injected late in the working cycle to assist in maintaining the oxidation/reduction balance in the catalytic converter.

It should be understood that the particular threshold pressure, MAP kPa values, and number of chamber pumping working cycles values provided in table 500 are merely exemplary and are provided for illustrative purposes. In actual implementation embodiments, the number of chamber pumping working cycle values, MAP kPa values, and kPa threshold value provided in the table may widely vary based on a number of factors, including but not limited to, engine displacement, cylinder size and/or the number of cylinders, engine operating conditions, ambient air conditions, barometric pressure, etc. For example, cylinder volumetric efficiency, which is indicative of air pumping efficiency, depends on intake and exhaust valve timing and engine speed and the values in table 500 may be adjusted based on valve timing and engine speed. For engines with cam actuated valves the valve timing is dependent on the cam phase angle.

It should be appreciated that the information contained in lookup table 500 can be expressed in alternative ways. For example, rather than describing DFCO operation in terms of a number of DFCO pumping cycles it may alternatively be expressed as a time or period of DFCO operation. The number of DFCO pumping cycles can be converted to a time period using a measured engine speed. Engine speed will likely change over the period of DFCO operation so a model of the engine speed over DFCO operation may be used to determine the total period of DFCO operation.

FIGS. 6A-6D depict a simplified schematic of representative behaviors of various engine parameters versus time during transitions from torque generation, to a DCCO event, to an idle event.

Prior to time $t_0$, the vehicle is assumed to be operating using engine supplied torque to drive the vehicle. The MAP is at some operating level $MAP_{op}$ below atmospheric pressure.

The DCCO event begins at time $t_0$ when fuel consumption is cut-off in response to a request for zero powertrain torque. As a result, air flow or pumping is reduced as shown in FIG. 6C and fuel consumption is reduced as shown in FIG. 6D.

Coincident with this zero-torque request, the vehicle wheels are disengaged from the engine, so both can spin independently. It should be appreciated that while in this example the vehicle wheels are disengaged from the engine, this is not always the case. For example, if the vehicle is initially operating at a high speed and high transmission gear, the wheels and engine may remain engaged until the vehicle speed has slowed to a certain level.

Since the engine is not producing torque, the engine speed (FIG. 6A) decreases due to frictional power losses.

Figure 6A:
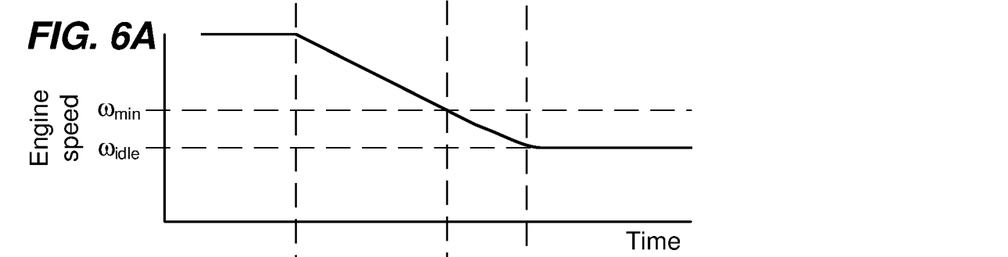
FIGS. 6A-6D shows changes in various engine parameters during a transition from torque generation to DCCO to idle in accordance with a non-exclusive embodiment of the invention.
Figure 6B:
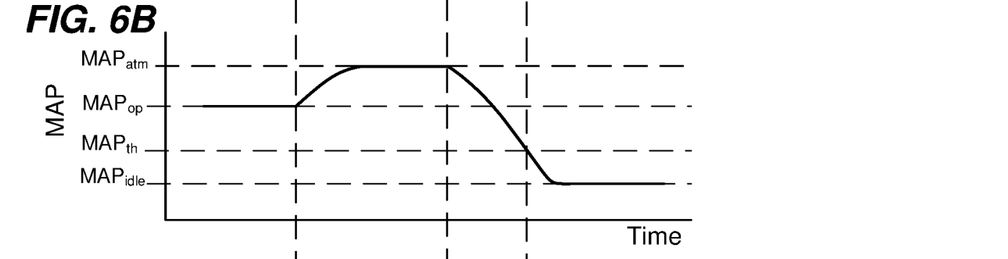
Figure 6C:
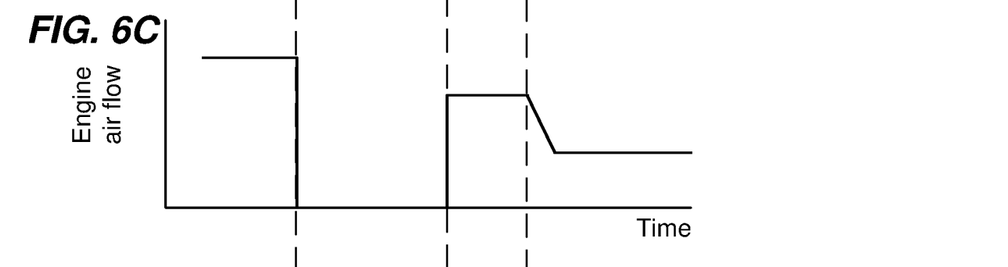
Figure 6D:
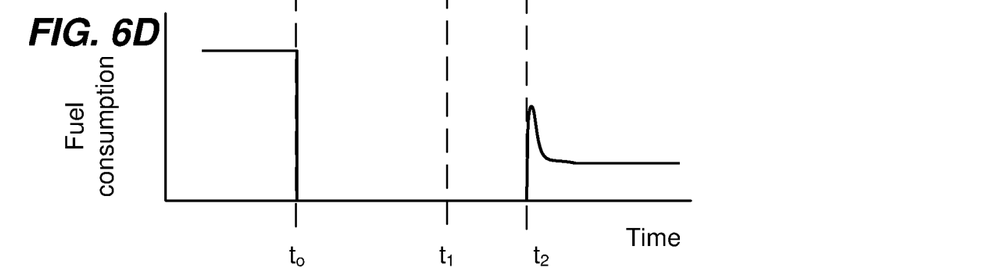

As illustrated in FIG. 6B, the MAP increases following time $t_0$ during DCCO operation, drifting towards atmospheric pressure. In this case, the DCCO event is of sufficient duration that the MAP reaches atmospheric pressure $MAP_{atm}$; however, this is not always the case. As the engine speed drops, at time $t_1$ the engine speed reaches $\omega_{min}$, which is a minimum speed for DCCO operation. The minimum speed for DCCO operation is set somewhat higher than the idle speed $\omega_{idle}$. For example, if the idle speed is 700 rpm the minimum DCCO speed may be 1000 rpm.

At time $t_1$ the controller 10 causes the engine to switch from DCCO mode to DFCO mode. As previously described, the controller 10 can determine a number of pumping cycles required to reduce the MAP to below a threshold level before fueling the engine and initiating combustion events. As these pumping cycles are executed between times $t_1$ and $t_2$, the MAP drops as illustrated in FIG. 6B as air flow or pumping through the engine occurs as illustrated in FIG. 6C.

At time $t_2$ the MAP has dropped to the MAP threshold ($MAP_{th}$) and DFCO operation ends. Fuel flow is initiated as illustrated in FIG. 6D and combustion resumes in a least some of the working chambers generating torque to maintain the engine speed at an idle speed, $\omega_{idle}$. There may be a spike in the fuel consumption as shown in FIG. 6D to rebalance the oxidation/reduction balance in the catalytic converter. The MAP level may continue to drop to a $MAP_{idle}$ level as shown in FIG. 6B. Alternatively, $MAP_{th}$ may be substantially equal to $MAP_{idle}$ and the MAP may remain substantially constant. To further smooth the engine transition into idle, as time approaches $t_2$ when DFCO operation is terminated, deactivated working cycles may be interspersed with pumping working cycles. This results in a more gradual engine deceleration, as the pumping induced engine deceleration increases with decreasing MAP. The pattern of pumping and deactivated working cycles may be defined in a look up table or may be dynamically calculated.

Although only a few specific embodiments and transition strategies have been described in detail, it should be appreciated that the invention may be implemented in many other forms without departing from the spirit or scope of the invention. The described algorithms can be implemented using software code executing on a processor associated with an engine control unit or powertrain control module or other processing unit, in programmable logic or discrete logic. The described approach is particularly well suited for use on engines having multiple working chambers although the same approach can be used on a single cylinder engine as well. The described approaches are well suited for use in a variety of internal combustion engines including spark ignition engines, diesel engines and other compression ignition engines. Therefore, the present embodiments should be considered illustrative and not restrictive and the invention is not to be limited to the details given herein, but may be modified within the scope and equivalents of the appended claims. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality. The foregoing description is merely exemplary in nature and is not intended to limit the present disclosure, application, or uses. It should be understood that throughout the drawings, corresponding reference numerals indicate like or corresponding parts and features. Therefore, the present embodiments should be considered illustrative and not restrictive and the invention is not to be limited to the details given herein, but may be modified within the scope and equivalents of the appended claims.

What is claimed is:

1. A method of transitioning an engine having a crankshaft from a first operational mode to an all cylinder cutoff operating mode using a skip fire approach in which some working cycles are fired and other working cycles are skipped, the method comprising:
   directing skip fire engine operation and gradually reducing an operational firing fraction to a threshold firing fraction during the skip fire engine operation; and
   deactivating all of the working chambers after reaching the threshold firing fraction, and
   wherein the crankshaft continues to rotate during the cylinder cutoff operating mode through an exit from the cylinder cutoff operating mode at which time at least some working cycles are fired.

2. A method as recited in claim 1 wherein the threshold firing fraction is in the range of 0.12 to 0.4.

3. A method as recited in claim 1 wherein the first operational mode is an all cylinder firing mode.

4. A method as recited in claim 1 wherein the first operational mode is a skip fire operational mode.

5. A method as recited in claim 1 wherein the working chambers associated with working cycles that are not fired during the gradual reduction are deactivated during the working cycles that are not fired.

6. A method as recited in claim 1 further comprising increasing driveline slip when deactivating all of the working chambers or while all of the cylinders are deactivated to reduce a coupling between vehicle speed and engine speed.

7. A method as recited in claim 6 wherein the driveline slip is increased by increasing a slip of a torque converter clutch (TCC).

8. A method of transitioning an engine from a first operational mode to an all cylinder cutoff operating mode using a skip fire approach in which some working cycles are fired and other working cycles are skipped, the method comprising:
   gradually reducing the fraction of the working cycles that are fired to a threshold firing fraction;
   deactivating all of the working chambers after reaching the threshold firing fraction; and
   reactivating at least some of the working chambers during at least some working cycles in response to a determination that a rotational speed of an engine crankshaft has fallen below a designated engine speed threshold to facilitate transition to an idle operation and to thereby prevent an engine stall.

9. A method of transitioning an engine from a first operational mode to an all cylinder cutoff operating mode using a skip fire approach in which some working cycles are fired and other working cycles are skipped, the method comprising:
   gradually reducing the fraction of the working cycles that are fired to a threshold firing fraction; and
   deactivating all of the working chambers after reaching the threshold firing fraction, wherein working chambers associated with skipped working cycles are deactivated during the skipped working cycles such that air is not pumped through such working chambers during the skipped working cycles.

10. A method as recited in claim 1 wherein fuel is not injected into the working chambers associated with skipped working cycles during the gradual operational firing fraction reduction using skip fire engine operation.

11. A method as recited in claim 1 wherein the engine is a diesel engine.

12. A method as recited in claim 1 wherein the engine is a spark-ignition engine.

13. A method as recited in claim 1 wherein the engine is a compression-ignition engine.

14. A method as recited in claim 1 wherein working chambers associated with skipped working cycles are deactivated during the skipped working cycles such that fuel is not injected into such working chambers during the skipped working cycles.

15. An engine controller configured to control a transition of an engine from a first operational mode to an all cylinder cutoff operating mode using a skip fire approach in which some working cycles are fired and other working cycles are skipped, the engine controller being configured to manage the transition by:
   gradually reducing a fraction of the working cycles that are fired to a threshold firing fraction; and
   deactivating all of the working chambers after reaching the threshold firing fraction such that air is not pumped through the deactivated working chambers such that the engine is operating in the cylinder cutoff operating mode; and
   wherein the crankshaft continues to rotate during the cylinder cutoff operating mode through an exit from the cylinder cutoff operating mode at which time at least some working cycles are fired.

16. An engine controller as recited in claim 15 further configured to deactivate working chambers associated with skipped working cycles during the skipped working cycles such that air is not pumped through such working chambers during the skipped working cycles.

17. An engine controller as recited in claim 15 wherein the threshold firing fraction is in the range of 0.12 to 0.4.

18. An engine controller as recited in claim 15 further configured to direct an increase in driveline slip when deactivating all of the working chambers or while all of the working chambers are deactivated to reduce a coupling between vehicle speed and engine speed.

19. An engine controller as recited in claim 18 wherein directing the increase in driveline slip is accomplished by directing an increased torque converter clutch (TCC) slip.

20. An engine controller configured to control a transition of an engine from a first operational mode to an all cylinder cutoff operating mode using a skip fire approach in which some working cycles are fired and other working cycles are skipped, the engine controller being configured to manage the transition by:

gradually reducing a fraction of the working cycles that are fired to a threshold firing fraction;

deactivating all of the working chambers after reaching the threshold firing fraction; and reactivating at least some of the working chambers during at least some working cycles in response to a determination that a rotational speed of an engine crankshaft has fallen below a designated engine speed threshold to facilitate a transition to an idle operation of the engine.

21. An engine controller as recited in claim 15 wherein the first operational mode is an all cylinder firing mode.

22. An engine controller as recited in claim 15 wherein the first operational mode is a skip fire operational mode.

23. An engine comprising:
a plurality of working chambers; and
an engine controller as recited in claim 15.

24. An engine controller as recited in claim 15 wherein the engine controller is further configured to direct fuel injectors not to inject fuel into the working chambers associated with the skipped working cycles during the skipped working cycles.

* * * * *